United States Patent
Oshita

(10) Patent No.: US 8,466,989 B2
(45) Date of Patent: Jun. 18, 2013

(54) CAMERA HAVING IMAGE CORRECTION FUNCTION, APPARATUS AND IMAGE CORRECTION METHOD

(75) Inventor: Koichi Oshita, Tokyo (JP)

(73) Assignee: Nikon Corporation, Tokyo (JP)

( * ) Notice: Subject to any disclaimer, the term of this patent is extended or adjusted under 35 U.S.C. 154(b) by 336 days.

(21) Appl. No.: 12/726,699

(22) Filed: Mar. 18, 2010

(65) Prior Publication Data

US 2010/0265365 A1 Oct. 21, 2010

(30) Foreign Application Priority Data

Mar. 19, 2009 (JP) .................................. 2009-067811

(51) Int. Cl.
*H04N 5/217* (2011.01)

(52) U.S. Cl.
USPC ......... 348/241; 348/222.1; 348/335; 382/274

(58) Field of Classification Search
USPC ................ 348/241, 222.1, 335; 382/275, 274
See application file for complete search history.

(56) References Cited

U.S. PATENT DOCUMENTS

| | | |
|---|---|---|
| 2005/0083427 A1 | 4/2005 | Imoto |
| 2008/0088699 A1 | 4/2008 | Fujita |
| 2008/0239107 A1 | 10/2008 | Cho |

FOREIGN PATENT DOCUMENTS

| | | |
|---|---|---|
| EP | 2 015 248 A1 | 1/2009 |
| JP | 2006-025340 A | 1/2006 |
| JP | 2008-099184 A | 4/2008 |

*Primary Examiner* — Sinh Tran
*Assistant Examiner* — Paul Berardesca
(74) *Attorney, Agent, or Firm* — Miles & Stockbridge P.C.

(57) ABSTRACT

A camera 1 for forming an image using an imaging lens 3 comprises a distortion correction unit 44 which, when a distortion of an image is corrected based on a focal length of the imaging lens 3 and an incident angle of rays from an object to the imaging lens 3, changes the amount of the correction according to the incident angle.

15 Claims, 8 Drawing Sheets

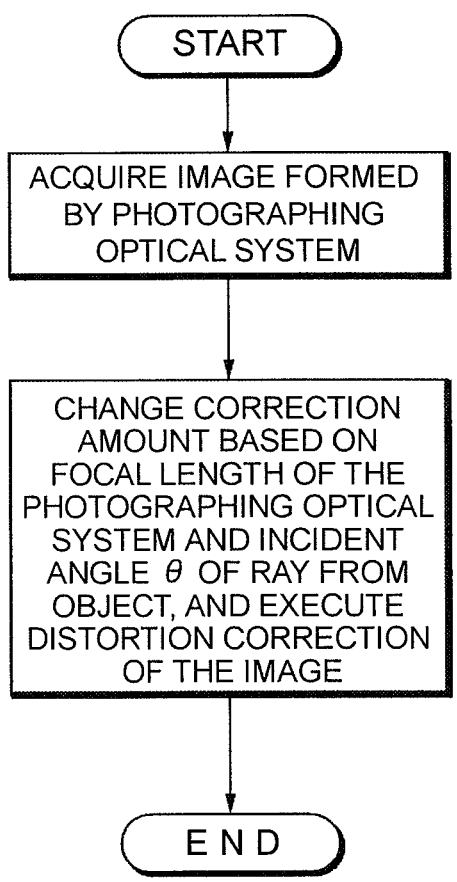

CAMERA HAVING IMAGE CORRECTION FUNCTION, APPARATUS AND IMAGE CORRECTION METHOD

INCORPORATION BY REFERENCE

This invention claims the benefit of Japanese Patent Application No. 2009-067811 which is hereby incorporated by reference.

FIELD OF THE INVENTION

The present invention relates to a camera having a distortion correction function for a photographed image, and an image correction method.

BACKGROUND OF THE INVENTION

In an imaging device, such as a digital camera, it is known that a photographed image is distorted by the distortion of the photographing optical system. This is due to the difference of imaging magnification between the center portion and edge portion of an image, and in the photographing optical system, a pin cushion distortion is generated in photographing in the telephoto state, and a barrel distortion is generated in photographing in the wide angle state. Digital cameras, on the other hand, have characteristics to acquire images as digital data, and various technologies to correct distortion by performing image processing (digital processing) on the image data have been proposed (e.g. see Japanese Patent Application Laid-Open NO. 2008-99184). Thereby the user can acquire photographed images with less distortion.

SUMMARY OF THE INVENTION

Problems to be Solved by the Invention

However if distortions are corrected as above, it means that the object can be photographed without distortion two-dimensionally, while the distortion still remains in the object viewed three-dimensionally. For example, when a commemorative photo or group shot is taken at a sightseeing location, a wide angle lens is frequently used for the photographing optical system in order to shoot the background as widely as possible. In such a case, as shown in FIG. 7, as the photographing angle becomes wider, the image of an individual 201 to be shot in the edge portion of the photographed image 200 is enlarged horizontally, and it looks broader, that is an image distortion problem called "perspective distortion" or "wide angle distortion" is generated, and the problem is how to implement a high quality image free from such distortion.

With the foregoing in view, it is an object of the present invention to provide a camera having a configuration to decrease distortion generated in photographed images at high precision, and an image correction method.

Means to Solve the Problems

To solve the above problem, a camera according to the present invention comprises a processing unit which, when distortion of an image formed by a photographing optical system is corrected based on a focal length of the photographing optical system and an incident angle θ of a ray from an object to the photographing optical system, changes an amount of the correction of the distortion of an image according to the incident angle θ.

It is preferable that the present invention further comprises a face detection unit which detects a face in the object, wherein the processing unit changes the amount of correction when the face detection unit detects a face in the image of the object.

It is preferable that the present invention further comprises a face detection unit which detects a face in the object, wherein the processing unit changes the amount of correction when the face detection unit detects a face at least in an edge portion of the image of the object.

It is preferable that the present invention further comprises a portrait mode in which the object is assumed to be an individual, and the processing unit changes the amount of correction when the portrait mode is applied.

It is preferable that the present invention further comprises a portrait mode in which the object is assumed to be an individual, and a face detection unit which detects a face in the object, and the processing unit changes the amount of correction when the portrait mode is applied, and the face detection unit detects a face at least in an edge portion of the image of the object.

In the present invention, it is preferable that a processing unit has a first and second correction patterns, the amounts of correction of which are different, and executes distortion correction for the first pattern, according to a projection system that satisfies the conditional expression: $y = f \cdot \tan \theta$, where y denotes an image height of an image generated by the photographing optical system, θ denotes an incident angle from the object to the photographing optical system, and f denotes a focal length of the photographing optical system, and executes distortion correction for the second correction pattern according to a projection system that satisfies the conditional expression: $f \cdot \theta < y < f \cdot \tan \theta$.

In the present invention, it is preferable that distortion correction is further executed for the second correction pattern according to a projection system that satisfies the conditional expressions: $x = f(u+1) \cdot \sin \theta / (u + \cos \theta)$ and $0.3 < u < 0.7$, where x denotes an image height from the center of the image along at least one direction out of the long side direction and the short side direction of the image, which pass through the center of the image and cross each other orthogonally, and u denotes a transformation coefficient of the projection system.

In the present invention, it is preferable that the one direction is the long side direction of the image.

In the present invention, it is preferable that the processing unit executes distortion correction according to a projection system that satisfies the conditional expression: $f \cdot \theta < y < f \cdot \tan \theta$, where y denotes an image height of an image generated by the photographing optical system, θ denotes an incident angle from the object to the photographing optical system, and f denotes a focal length of the photographing optical system.

In the present invention, it is preferable that the processing unit executes distortion correction according to a projection system that satisfies the conditional expressions: $x = f(u+1) \cdot \sin \theta / (u + \cos \theta)$ and $0.3 < u < 0.7$, where x denotes an image height from the center of the image along at least one direction out of the long side direction and the short side direction of the image, which pass through the center of the image and cross each other orthogonally, and u denotes a transformation coefficient of the projection system.

In the present invention, it is preferable that the one direction is the long side direction of the image.

An apparatus having the image correction function according to the present invention, comprises a processing unit which, when distortion of an image is corrected based on a focal length of a photographing optical system and an incident angle θ of a ray from an object to the photographing optical system, changes an amount of the correction of the distortion of an image according to the incident angle θ.

An image correction method according to the present invention, comprises an image acquisition step of acquiring an image formed by a projection optical system; and a distortion correction step of correcting a distortion generated in the image based on the focal length of the photographing optical system and an incident angle θ of a ray from an object to the photographing optical system. The distortion correction is executed by changing an amount of correction based on the focal length of the photographing optical system and the incident angle θ.

It is preferable that the method according to the present invention further comprises a face detection unit which detects a face in the object, and the amount of correction is changed when the face detection unit detects a face in at least an edge portion of the image of the object.

In the method according to the present invention, it is preferable that distortion correction is executed according to a projection system that satisfies the conditional expression: $f \cdot \theta < y < f \cdot \tan\theta$, where y denotes an image height of an image generated by the photographing optical system, θ denotes an incident angle from the object to the photographing optical system, and f denotes a focal length of the photographing optical system.

In the method according to the present invention, it is preferable that distortion correction is executed according to a projection system that satisfies the conditional expressions: $x = f(u+1) \cdot \sin\theta / (u + \cos\theta)$ and $0.3 < u < 0.7$, where x denotes an image height from the center of the image along at least one direction out of the long side direction and the short side direction of the image, which pass through the center of the image and cross each other orthogonally, and u denotes a transformation coefficient of the projection system.

Advantageous Effects of the Invention

According to the present invention, a camera, an apparatus and an image correction method for acquiring a uniform image of which distortions are decreased at high precision, can be implemented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 8 is a flow chart depicting an image correction method according to an embodiment of the present invention.

DESCRIPTION OF THE PREFERRED EMBODIMENTS

Figure 1A:
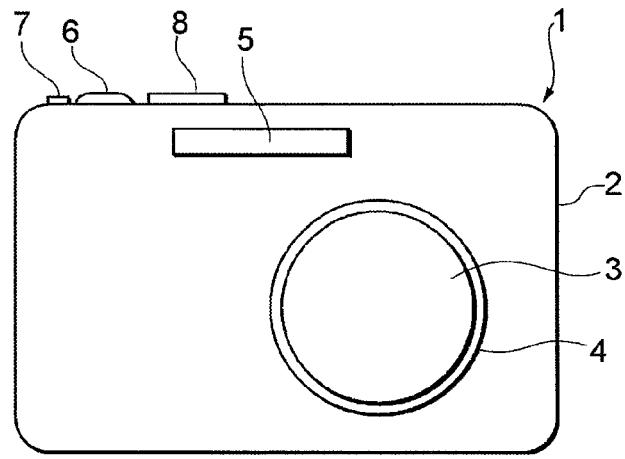
FIG. 1 are external views of a camera according to an embodiment of the present invention, where A of FIG. 1 is a front view and B of FIG. 1 is a rear view.
Figure 1B:
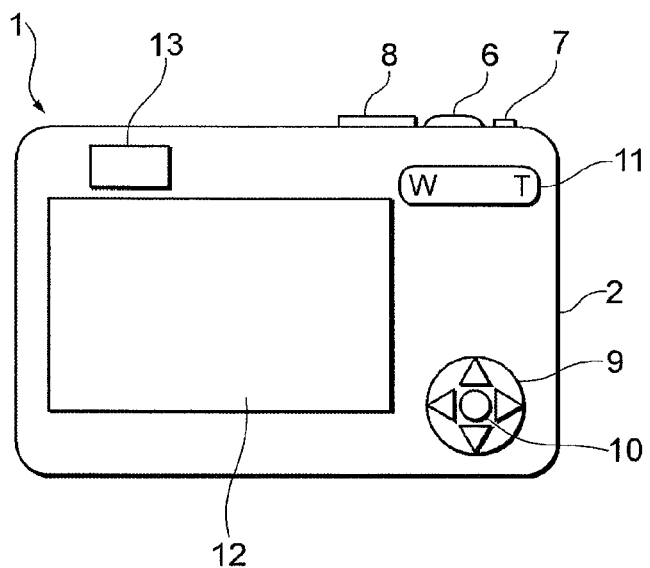

Embodiments of the present invention will now be described with reference to the drawings. FIG. 1 shows an external view of a digital camera 1 according to the present embodiment, and the general configuration of the digital camera 1 will be described first with reference to this drawing.

The digital camera 1 has an imaging lens 3 installed in a lens barrel 4, and a stroboscopic emission unit 5, which emits auxiliary light when photographing light quantity is insufficient (when an object is dark), on a front face of the camera main unit 2 which is roughly, a rectangular-parallelopiped.

On the top face of the camera main unit 2, a release button 6, power button 7 and a mode dial 8, among others, are disposed. The release button 6 is a button that can select two levels, half pressed or full pressed, and if the release button 6 is half pressed, a photographing preparation operation, such as automatic exposure control (AE) and automatic focus control (AF), is executed, and if the release button 6 is full pressed, an image of the object is recorded. The power button 7 switches the power supply of the digital camera 1 ON/OFF by being depressed and held down.

The mode dial 8 is a dial which can switch the operation mode of the digital camera 1 by a rotation operation, so that camera functions, such as display mode, setting mode and photographing mode, can be changed. As photographing modes, the digital camera 1 has a portrait mode (for photographing an individual), distant view mode, night view mode and sports mode and the like, and photographing conditions are automatically controlled according to the selected photographing mode, so as to photograph appropriately for the respective photographing scene. For example, the portrait mode is a photographing mode in which an individual is the primary object, and the distant view mode is a photographing mode in which a landscape is the object.

On the rear surface of the camera main unit 2, a cross key 9, decision button 10, zoom button 11, liquid crystal monitor 12 and optical finder 13 are disposed. The cross key 9 is controlled to select various menus and images displayed on the liquid crystal monitor 12. The decision button 10 is a button to operate when deciding the item selected by the cross key 9. The zoom button 11 is a button to optically and electronically zoom in on or zoom out from an image to be recorded upon being photographed. The liquid crystal monitor 12 is a liquid crystal display (LCD) to display an object as a video during photographing, or to display photographed and recorded images and various menu screens. The optical finder 13 is for optically confirming the object field.

Figure 2:
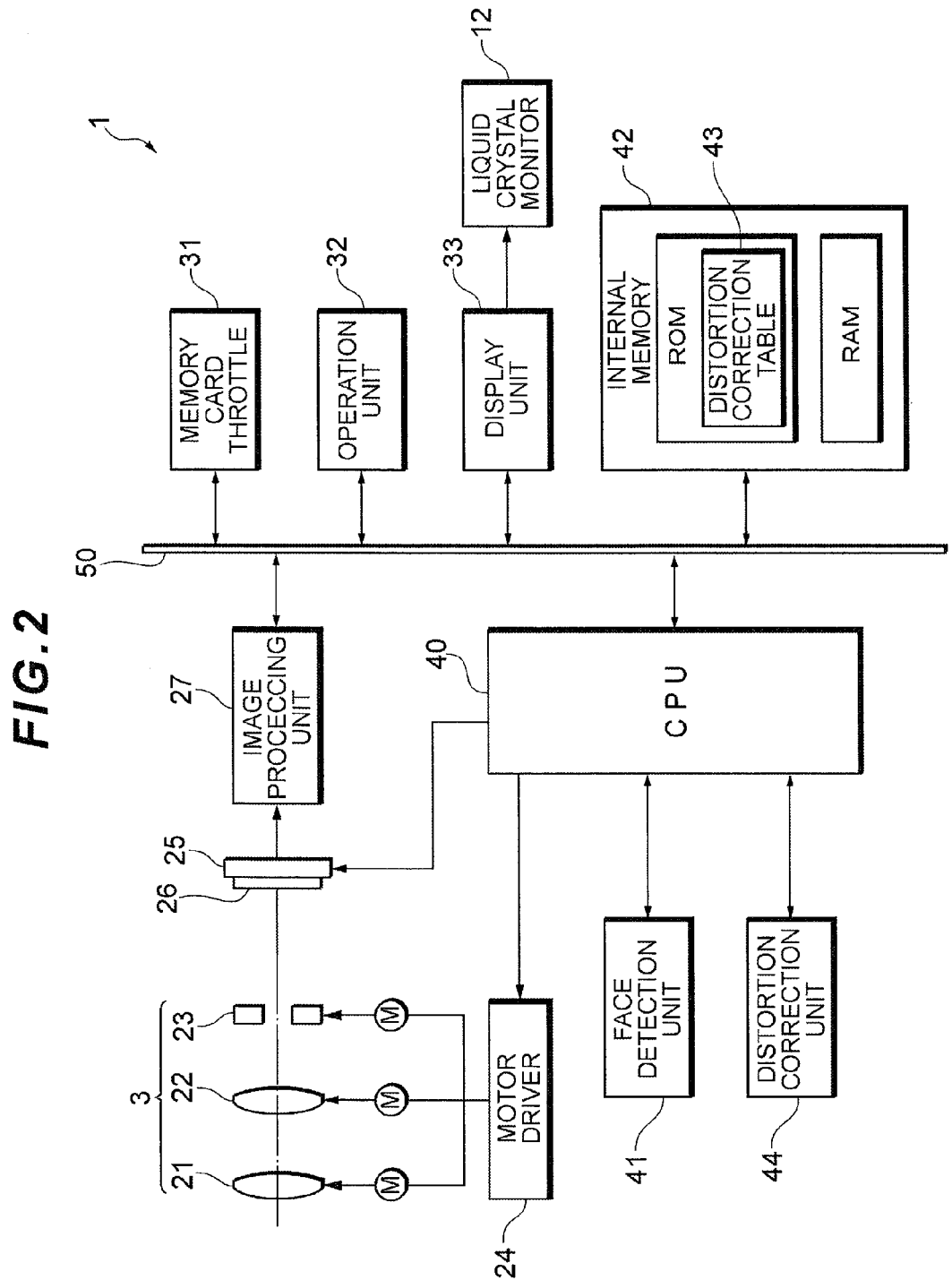
FIG. 2 is a block diagram depicting a configuration of the camera according to the embodiment.

FIG. 2 is a block diagram depicting the functions of the digital camera 1 according to the present embodiment. As FIG. 2 shows, the digital camera 1 has an imaging lens 3, motor driver 24, image sensing element 25, image processing unit 27, memory card throttle 31, control unit 32, display unit 33, liquid crystal monitor 12, CPU 40, face detection unit 41, internal memory 42, distortion correction unit 44 and data bus 50 among others. The image processing unit 27, memory card throttle 31, operation unit 32, display unit 33, CPU 40 and internal memory 42 are connected via the data bus 50. Needless to say, the digital camera 1 also has a circuit unit to implement camera functions, but a description thereof is omitted.

The imaging lens 3 is comprised of a zoom lens 21, focus lens 22, diaphragm 23 and so forth, and is a photographing optical system for forming an object image on a light receiving surface 26 of the image sensing element 25. The zoom lens 21 and focus lens 22 are disposed along the optical axis of the imaging lens 3 so as to freely move in the wide angle end side direction or telephoto end side direction. The zoom lens 21 is a lens that is moved by a motor according to the pressing operation of zoom button 11, so as to zoom in on or zoom out from (change photographing magnification of) the optical image formed on the image sensing element 25. The focus lens 22 is a lens that is moved by the motor according to the pressing operation of the zoom button 11, movement of the zoom lens 21 and half pressing operation of the release button 6, in order to control focus. The diaphragm 23 controls the light quantity of the object field that enters the image sensing element 25 by changing the diaphragm opening area according to the half pressing control of the release button 6. The motor driver 24 drives each motor based on the instruction of the CPU 40, so as to move the zoom lens 21 and focus lens 22 to predetermined positions, and control the opening state of the diaphragm 23.

The image sensing element 25 is a solid image sensing element that is disposed on the back of the imaging lens 3, and is constituted by a CCD and CMOS, for example, to photoelectric converting an optical image of an object, which the imaging lens 3 formed on the light receiving surface 26, into electric signals, and outputting the analog imaging signals. The light receiving surface 26 is formed to be a rectangular shape having a long side in the lateral direction and a short side in the longitudinal direction.

The image processing unit 27 removes noise from the analog electric signals that are output from the image sensing element 25, and performs analog/digital conversion to generate digital signals. The image processing unit 27 also performs interpolation processing on the digital signals converted from analog signals to generate image data for display, which is displayed on the liquid crystal monitor 12, and image data for recording. The memory card throttle 31 is a throttle which writes such data as photographed image in a memory card (storage medium) that is removably installed in the digital camera 1 or erases data in the memory card.

The control unit 32 has a release button 6, power button 7, mode dial 8, cross key 9, decision button 10, zoom button 11 and so forth, and detects the half press operation and full press operation of the release button 6 or the like. The display unit 33 generates screen data based on the instruction from the CPU 40, and displays this image data on the liquid crystal monitor 12 disposed on the rear face side of the digital camera 1.

The CPU 40 is a circuit which processes the control programs for implementing various functions executed by the digital camera 1. The CPU 40 reads and executes the control programs stored in the CPU memory and the internal memory 42, so as to comprehensively control each unit in the digital camera 1.

The face detection unit 41 extracts an individual by analyzing the characteristic quantities of an individual on the image data captured by the image sensing element 25, and detects the face area of the object. The face detection unit 41 specifies the size and position of a face of an individual in the photographed image by extracting the pupils (eyes) of the individual and the contour of the face, for example. If the face detection unit 41 recognizes a face in the image data, the CPU 40 performs focus control for focusing the focal point of the imaging lens 3 on the face area, exposure control to adjust exposure of the face area to the optimum, and so forth.

The internal memory 42 is comprised of a ROM, which stores control programs (firmware) to have the CPU 40 execute various processings, RAM, which stores various data including image data captured by the image sensing element 25, and the like. The internal memory 42 stores a face detection program which is executed for detecting the face area of the object, and can also store facial information of the object, such as face position and face size acquired by the face recognition processing. In the ROM of the internal memory 42, the distortion correction table 43, that is used for correcting distortion of the captured image, is stored.

In the distortion correction table 43, the later mentioned distortion correction unit 44 stores the coefficients of the distortion correction functions that are read when the distortion of photographed images are corrected.

The distortion correction unit 44 performs image transformation processing on the photographed image data using a predetermined distortion correction function so as to correct the distortion generated by the distortion of the imaging lens 3. For example, the distortion correction function dis (r) can be represented by the following polynomial:

$$\mathrm{dis}(r) = A_0 + A_1 \times r + A_2 \times r^2 + A_3 \times r^3 + \ldots + A_n \times r^n \qquad (1)$$

Here, r denotes an image height from the center of the image before image transformation processing, and An ($A_0$, $A_1$, $A_2$, $A_3$, ...) is a polynomial coefficient (distortion coefficient) in each term of a degree, and is stored in the distortion correction table 43. The present invention is not limited to this, but may be constructed such that a data table of the distortion data of the imaging lens 3 is created for each position (pixel position) of the captured image, and is stored in the distortion correction table 43, and is read by the distortion correction unit 44 to perform image transformation processing (distortion correction) on the photographed image data.

In the digital camera 1 constructed as above, a projection system of the imaging lens 3 is used according to $$r = f \times \tan \theta \qquad (2)$$

where r denotes an image height of the image sensing element 25 on the light receiving surface 26, f denotes a focal length of the imaging lens 3, and $\theta$ denotes an incident angle (half angle of view) from the object.

Generally a pin cushion distortion or barrel distortion is generated on an image captured based on the projection system according to Expression (2), because of the distortion of the imaging lens 3 generated due to the difference of the image forming magnification between the center portion and edge portion of the image frame (barrel distortion in particular tends to be generated in the wide angle end of the lens). To correct this distortion, the distortion correction unit 44 performs image transformation processing on the photographed image data using the distortion correction function dis (r) shown in Expression (1), as mentioned above, then a less distorted image can be acquired.

However this means that a two-dimensional object can be photographed without distortion, but in the case of a three-dimensional object, distortion in which the image of an object at the edge portion of the image frame is enlarged (this is generally called "perspective distortion" or "wide angle distortion", and is referred to as "wide angle distortion" in the following description) is still generated separately from the above mentioned distortion.

Figure 3:
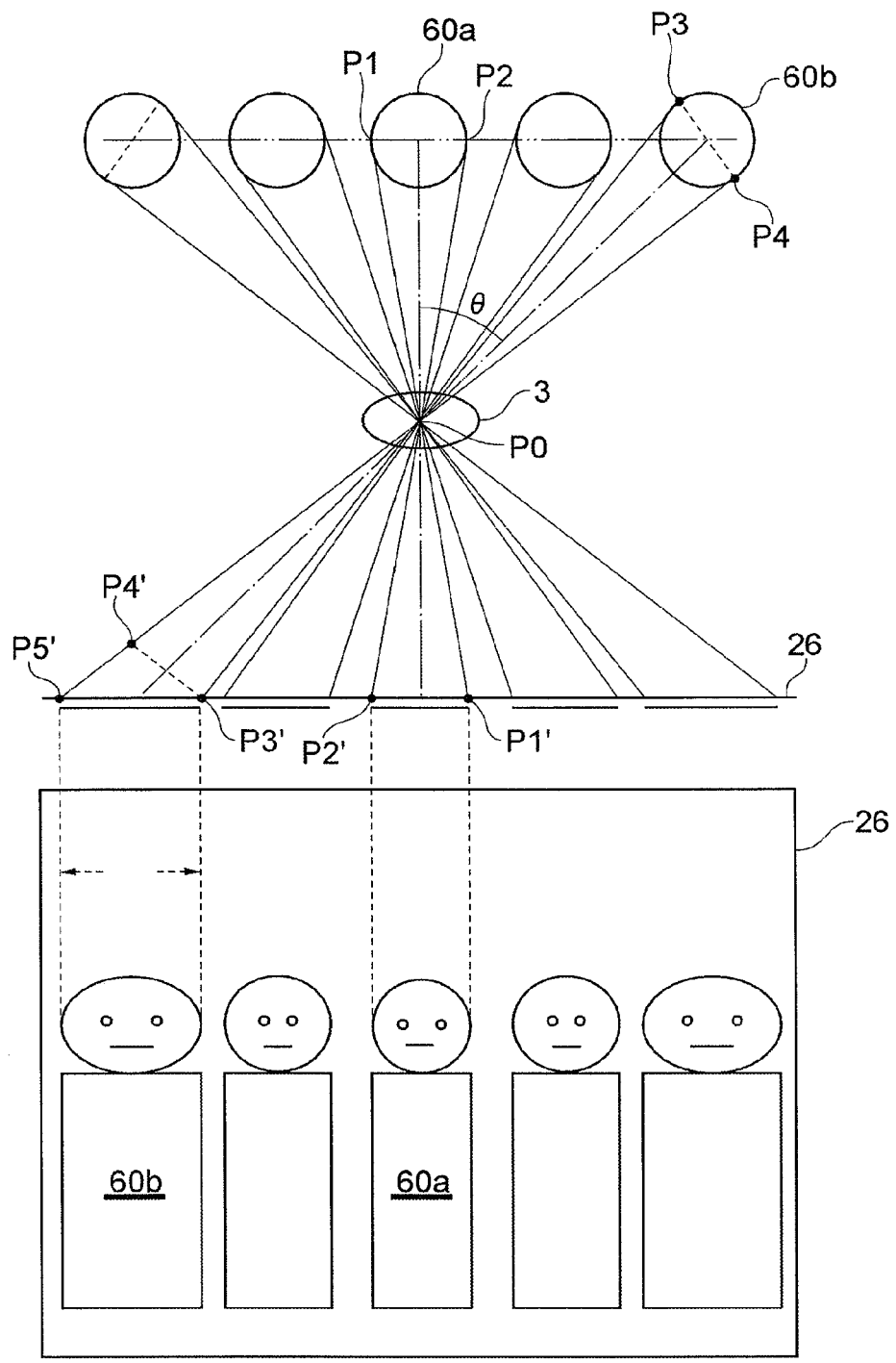
FIG. 3 is a diagram depicting a wide angle distortion of object images photographed on the edge of the screen.

FIG. 3 is a diagram depicting the wide angle distortion of an object image photographed at the edge portion of a screen, and how the wide angle distortion is generated will be described referring to this diagram. If a three-dimensional object is an individual, a head portion of the individual is regarded as a spherical shape, and the body portion is regarded as a cylindrical shape, and as shown in FIG. 3 if individuals are lined up side by side in front of the digital camera 1 and photographed, individuals photographed at the edge portions are laterally enlarged by $1/\cos\theta$, where $\theta$ is an incident angle.

In the case of an individual 60a positioned directly in front of the imaging lens 3, a triangle P0P1P2 created by segment P1P2 that is a diameter of this individual (approximated by the spherical or cylindrical body) 60a and the center of the imaging lens P0, and a triangle P0P1'P2' created by an image P1'P2' of the segment P1P2, formed on the light receiving surface 26, and the center of the imaging lens P0, are similar figures, therefore the image of this individual 60a is formed on the light receiving surface 26 as an ideal image. In the case of an individual 60b positioned at the edge portion, on the other hand, a triangle P0P3P4 created by a segment P3P4 that is a diameter of this individual (approximated by the spherical or cylindrical body) 60b and the center of the imaging lens P0, and a triangle P0P3'P5' created by an image P3'P5' of the segment P3P4, formed on the light receiving surface 26 and the center of the imaging lens P0 are not similar figures, and an image of the segment P3P4 is formed on the light receiving surface 26 as the segment P3'P5', that is a segment when the ideally scaled segment P3'P4' is enlarged. This is the reason why an image of an individual positioned at the edge portion of a screen is photographed in a laterally enlarged state, and looks broader as shown in FIG. 3.

Therefore in order to decrease this wide angle distortion of a three-dimensional object image, a projection system, with which the horizontal (lateral) size and vertical (longitudinal) size of an image formed on the light receiving surface 26 of the image sensing element 25 match with those of a three-dimensional (spherical) object, should be selected. According to the digital camera 1 of the present embodiment, the distortion correction unit 44 not only performs distortion correction generated by the distortion of the imaging lens, but also performs image transformation processing for transforming the image data captured by the image sensing element 25 into an image in another projection system described next.

Figure 4:
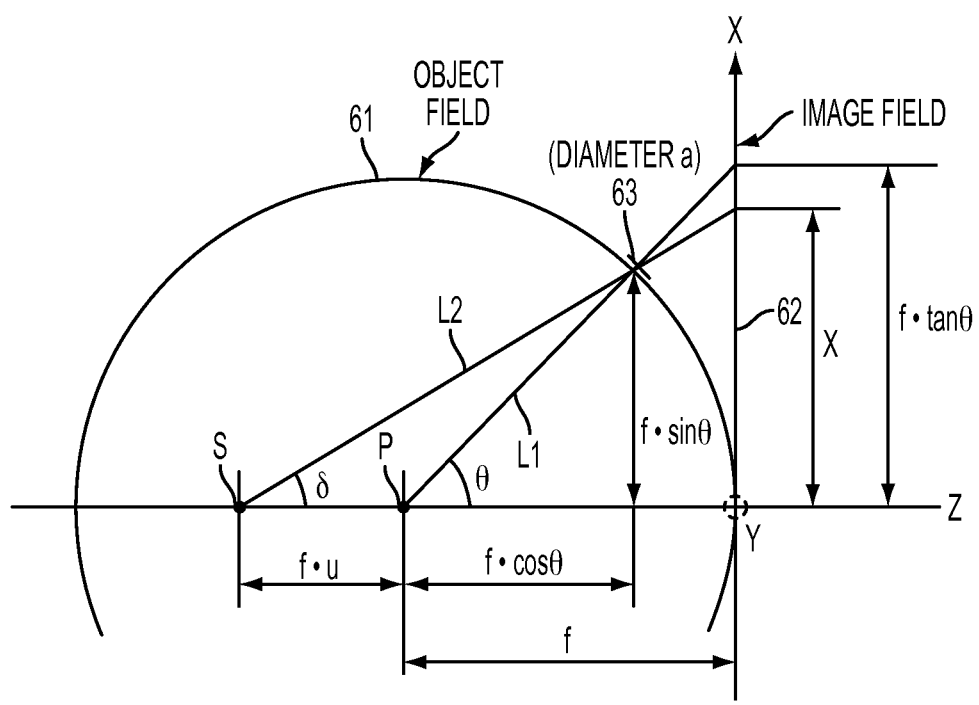
FIG. 4 is a diagram depicting a projection system used for the image transformation processing in the camera of the embodiment.

FIG. 4 is a diagram depicting a projection method applied to the present embodiment for the distortion correction unit 44 to perform image transformation processing. When an object (object field) is represented by a sphere 61 of which center is the point P, the object image (image field) is represented by a plane 62 contacting the sphere, and the distance between the center P of the sphere 61 and the plane 62 (contact point thereon) (in other words, the radius of the sphere 61) is denoted by the focal length f, the projection system of the normal lens shown in Expression (2) ($r=f\cdot\tan\theta$) is represented by the line L1 from the point P to the plane 62. In FIG. 4, an XYZ rectangular coordinate system is set as illustrated, where the Y axis is set in a direction perpendicular to the page face, the X axis is set, along with the Y axis, to be parallel with the plane, and the Z axis is set to be perpendicular to the plane.

This projection system for image transformation, on the other hand, can be represented by the line L2 from the point S, that is distant from the point P by the distance $f\cdot u$ along the Z axis (u is an arbitrary variable), to the plane 62 (XY plane), and the height x of the intersection of this line L2 and the plane 62 is the image height of the object in the image field. In other words, this projection system is expressed by the following expression.

$$x = f(u+1) \times \tan\delta \quad (3)$$

where $\delta$ denotes an angle formed by the Z axis and the line L2. Since as FIG. 4 shows, $$\tan\delta = \sin\theta/(u+\cos\theta) \quad (4)$$

this expression is substituted for Expression (3) to eliminate $\delta$, then x is given by $$x = f(u+1)\cdot\sin\theta/(u+\cos\theta) \quad (5)$$

In Expression (5), $x = f\cdot\tan\theta$ is established when u=0, that is, a normal projection system, $x = 2f\cdot\sin(\theta/2)$ is established when u=1, that is, a stereographic projection system, and $x = f\cdot\sin\theta$ is established when u=∞, that is, an orthogonal projection system. This means that if an optimum projection system is derived by appropriately selecting the value u, the image height x can be changed, and an image with less wide angle distortion can be acquired. In the description herein below, u is called a "transformation coefficient" of a projection system.

A condition to acquire an image free from distortion, in a case of an image of an object 63 represented by a small disk with diameter a in the object field, is that the size $\Delta x$ in the X axis direction and the size $\Delta y$ in the Y axis direction of this image in the image field must be the same, that is $$\Delta x = \Delta y \quad (6)$$

In this case, $\Delta x$ can be, in general, expressed by the following Expression (7).

$$\Delta x = a\cdot f(u+1)(\cos(\theta-\delta))/((u+\cos\theta)\cdot\cos\delta) \quad (7)$$

If Expression (7) is transformed, so as to eliminate $\delta$ using the fundamental expression of the trigonometric function, then $\Delta x$ can be transformed as follows.

$$\Delta x = a\cdot f(u+1)(u\cdot\cos\theta+1)/(u+\cos\theta)^2 \quad (8)$$

The size $\Delta y$ of the image of the object 63 in the Y axis direction, on the other hand, can be given by the following Expression (9), because of the condition that the horizontal line (lateral line) of the two-dimensional object is not distorted near the X axis (Y=0).

$$\Delta y = a\cdot f/\cos\theta \quad (9)$$

Therefore the following Expression (10) can be acquired by substituting Expression (8) and Expression (9) for $\Delta x = \Delta y$, which is the above mentioned conditional Expression (6).

$$a\cdot f(u+1)(u\cdot\cos\theta+1)/(u+\cos\theta)^2 = a\cdot f/\cos\theta \quad (10)$$

This expression (10) can be transformed and simplified to become the following Expression (11), although some steps are omitted.

$$(\cos\theta+1)\cdot u^2 + (\cos\theta)\cdot u - \cos\theta = 0 \quad (11)$$

u is solved as follows by using Expression (10):

$$u = (-\cos\theta + (5\cos\theta^2 + 4\cos\theta)^{1/2})/(2(\cos\theta+1)) \quad (12)$$

which shows that u is a function that depends only on the incident angle $\theta$.

According to Expression (12), u=0.5 if $\theta=0°$, and u=0.46 if $0°<\theta\leq 45°$, therefore these u values are good values to correct a wide angle distortion under the respective conditions. If $\theta$ is greater than 45°, u becomes a value smaller than 0.46. The above description is based on the assumption that the distortion in an image near the X axis is decreased, but needless to say, wide angle distortion can be decreased for an image in a position distant from the X axis by appropriately selecting u.

As described above, u is a function that depends on θ, and in order to acquire a uniform image with less wide angle distortion, it is preferable that u satisfies the conditions of the following Expression (13) in Expression (5) that expresses image height x.

$$0.3 < u < 0.7 \tag{13}$$

When u satisfies the conditional Expression (13), the image height x satisfies the following expression in Expression (5):

$$F \cdot \theta < x < f \cdot \tan \theta \tag{14}$$

and it is shown that the present projection system in which u is appropriately selected to satisfy the conditional expression (13) is a projection system between a conformal projection system (x=f·θ) and a normal lens projection system (x=f tan θ).

To ensure the effect of the present embodiment, it is preferable that the upper limit value of the conditional Expression (13) is 0.65. Also to ensure the effect of the present embodiment, it is preferable that the lower limit value of the conditional Expression (13) is 0.35.

In this way, the distortion correction unit 44 executes the image transformation processing for transforming an image captured based on the projection system shown in Expression (2) into an image based on a projection system that satisfies Expression (5) and Expression (13), and can easily acquire an image of which distortion is appropriately decreased.

According to the present embodiment, it is preferable to execute the image transformation processing by the distortion correction unit 44 when the photographing conditions satisfy (a) the photographing mode selected by the mode dial 8 is portrait mode in which the object is assumed to be an individual, (b) the face detection unit 41 recognizes a face of an individual in the image captured by the image sensing element 25, or (c) the face detection unit 41 recognizes a face of an individual in an edge portion of the image, for example. This is to ensure the effect of preventing the above mentioned problem of an image of an individual (particularly an individual at the edge portion of a screen) being enlarged, by correcting the wide angle distortion on an image photographed when the primary photographed object is an individual.

Figure 5:
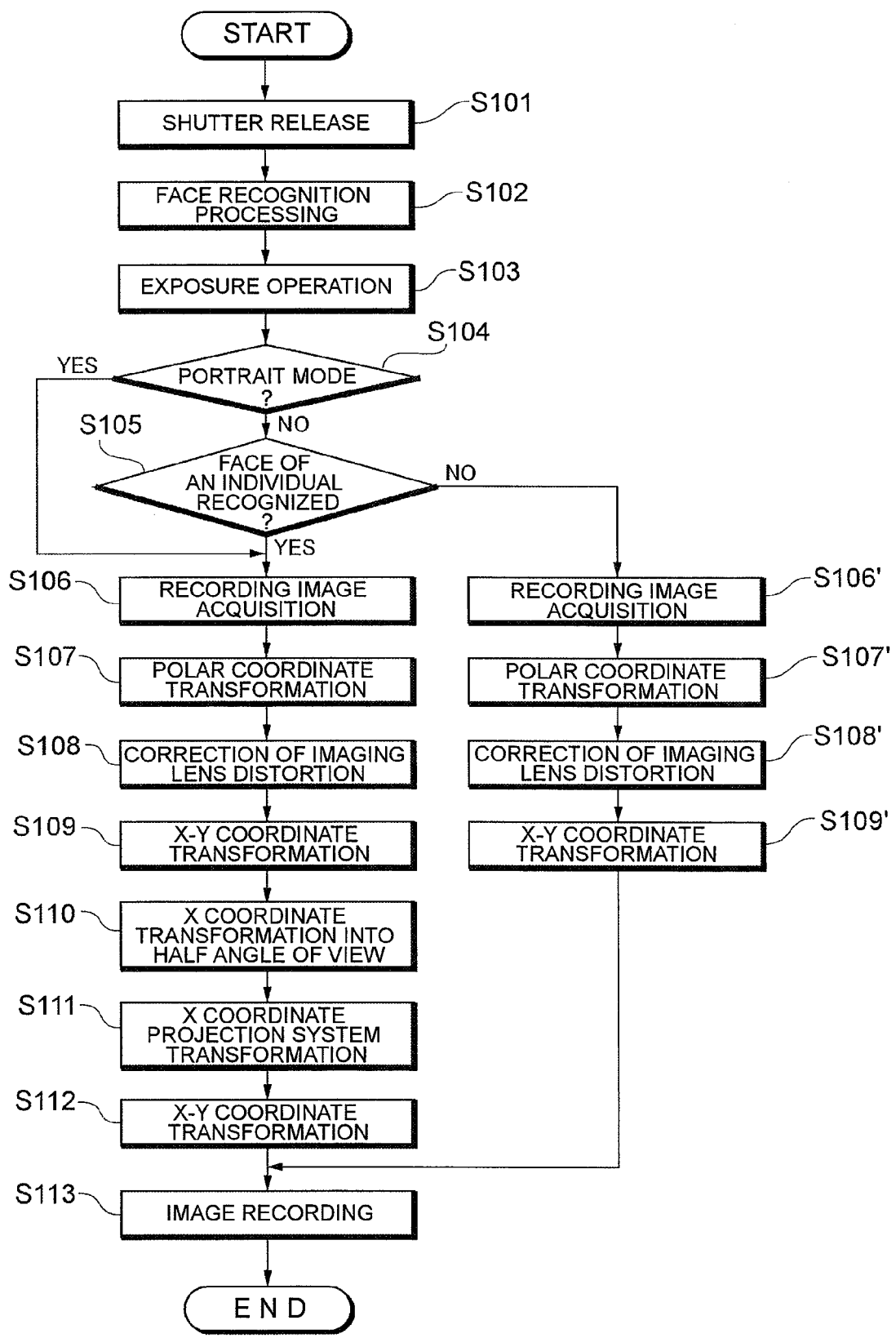
FIG. 5 is a flow chart depicting the operation of the camera of the embodiment.
Figure 6:
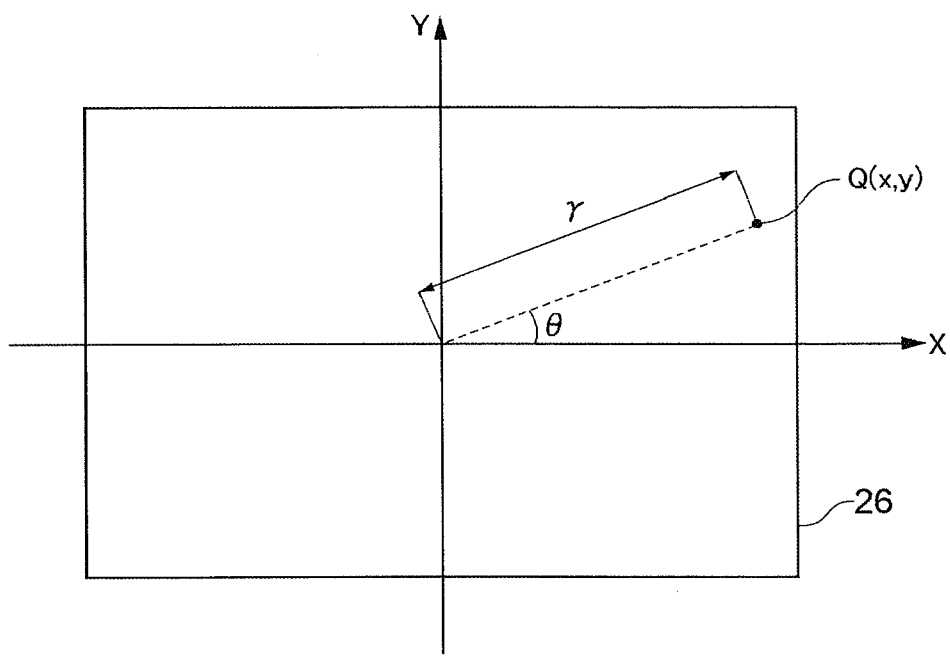
FIG. 6 is a diagram showing the coordinate system on a light receiving surface.
Figure 7:
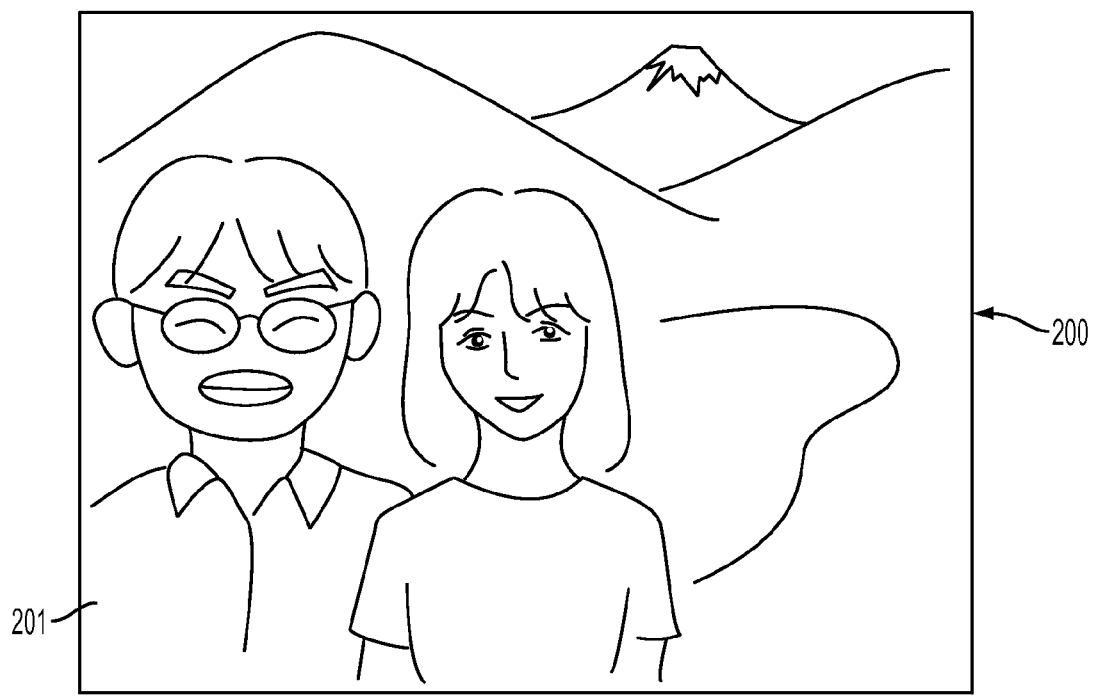
FIG. 7 is a drawing to show the wide angle distortion in an image photographed by a conventional camera.

Now an example of an operation of the digital camera 1 according to the present embodiment having the above mentioned configuration will be described with reference to FIG. 5 and FIG. 6. FIG. 5 is a flow chart depicting the photographing operation of the digital camera 1, and FIG. 6 is a diagram depicting the coordinate system of the light receiving surface 26 (image frame) of the image sensing element 25.

When the user operates the power button 7, whereby the power of the digital camera 1 is turned ON and the operation mode is set to photographing mode, the CPU 40 controls the image processing unit 27, display unit 33 or the like to display the video image of the object on the liquid crystal monitor 12 as a through picture. The user confirms the video image displayed on the liquid crystal monitor 12, and determines the photographing composition.

If the user instructs photographing preparation by half pressing the release button 6 when the thorough image is displayed on the liquid crystal monitor 12 (step S101), the face detection unit 41 executes face recognition processing based on the image that is input from the image processing unit 27 (step S102). If the user then instructs photographing by full pressing the release button 6, the CPU 40 executes photographing processing, such as exposure operation, so that exposure of the photographed image becomes the optimum (step S103).

In step S104, it is judged whether the photographing mode, which was selected by the mode dial 8 before photographing, is portrait mode or not, and if portrait mode is selected, that is, step S104 is YES, processing advances to step S106. If another photographing mode is selected, that is, step S104 is NO, processing advances to step S105, and it is judged whether a face of an individual is recognized in the photographed image as a result of the face recognition processing in step S102. The case of a face being recognized means a case of a face being recognized somewhere in the image frame regardless the position, but is not limited to this, and may be a case of a face being recognized only at the edge portion of the image frame. If step S105 is YES, that is if a face of an individual is recognized in step S102, processing advances to step S106.

In step S106, the CPU 40 acquires an image (imaging signal) from the image sensing element 25 and inputs the image to the image processing unit 27, and acquires the image on which the image processing unit 27 executed the above mentioned image processing. Then the distortion correction unit 44 performs coordinate transformation processing for transforming the coordinate system on the light receiving surface 26 of the image sensing element 25 from the rectangular coordinate system, which is an X axis (axis in the long side (lateral) direction of the light sensing element 25) and Y axis (axis in the short side (longitudinal) direction of the image sensing element 25) with the center of the light receiving surface as a reference, into a polar coordinate system (step S107). In this coordinate transformation processing, the coordinate (x, y) of an arbitrary point (pixel) Q on the light receiving surface 26 is transformed into a polar coordinate (r, α) given by the following Expressions (15) and (16).

$$r = (x^2 + y^2)^{1/2} \tag{15}$$

$$\alpha = a \tan(y/x) \tag{16}$$

Then the distortion correction unit 44 connects the distortion of the image data of which coordinate was transformed into this polar coordinate (r, α) based on the distortion of the imaging lens 3 (step S108). Each value of the polar coordinate (r', α') after distortion correction is given by the following expressions using the above mentioned distortion correction function dis (r) of Expression (1):

$$r' = r/(1 + \text{dist}(r)) \tag{17}$$

$$\alpha' = \alpha \tag{18}$$

In this distortion correction, the angle α' formed by the reference axes X and Y does not change, and only the size of the image height r' after correction is changed.

Then a processing to retransform (return) this polar coordinate (r', α') to the coordinate (x', y') on the XY coordinate system corresponding to the light receiving surface 26 is performed (step S109).

$$x' = r' \cos \alpha' \tag{19}$$

$$y' = r' \sin \alpha' \tag{20}$$

Up to this point marks the flow of general distortion correction, and from this point on marks the flow of wide angle distortion correction according to the present embodiment. To simplify description, the wide angle distortion correction processing of an image in the X axis direction (long side direction) will be described as an example.

The incident angle $\theta_x$ from the object is given by $$\theta_x = a \tan(x/f) \tag{21}$$

where f denotes a focal length of the imaging lens 3 with respect to x', that is the distance (image height) from the image center along the X axis direction (step S110). The distance x' from the image center is applied to the conditional Expression (5) above, described using the transformation coefficient u of the projection system (step S111), and the coordinate (x", y") after being transformed into an image in the projection system based on Expression (5) is given by the following Expressions (5)' and (22) (step S112).

$$x''=f(u+1)\cdot\sin\theta_x/(u+\cos\theta_x) \quad (5)'$$

$$y''=y' \quad (22)$$

Here an image compressed in the X axis direction (lateral direction), of which wide angle distortion has been appropriately corrected, can be acquired by appropriately selecting the transformation coefficient u of the projection system given by Expression (5)' within the range of the above mentioned conditional Expression (13).

If a face is not detected in an image and step S105 resulted in NO (that is, if both step S104 and step S105 resulted in NO), processing advances to step S106'. Step S106' to step s109' are the same as the above mentioned processings in step S106 to step S109, which is the general distortion correction flow, therefore redundant description is omitted here.

The CPU 40 then compresses the image-transformed image data, and records it in the internal memory 42 (RAM) (step S113). The CPU 40 displays this image acquired by photographing on the liquid crystal monitor 12 only for a predetermined time. Thereby a series of photographing operations by the digital camera 1 ends.

According to the digital camera 1 of the present embodiment, the acquired image is transformed into an image in the projection system shown in Expression (5) or the like, so as to correct wide angle distortion appropriately, whereby a uniform image which is free from linear distortion in the horizontal and vertical directions and has less distortion of an individual at the edge portion of a screen can be acquired.

According to the digital camera 1 of the present embodiment, some distortion may be generated in diagonal lines, although the distortions of the horizontal and vertical lines are improved, and also when a regular pattern, such as tiles on a wall, is photographed, the pattern at the edge portion of the screen may become slightly elongated. Therefore this digital camera 1 is most appropriate when a major object to be photographed is an individual.

In the above embodiment, wide angle distortion correction processing on a captured image only in the X direction (long side direction) was described, but the present invention is not limited to this, and wide angle distortion may also be corrected for the Y axis direction (short side direction), or for both the X and Y axis directions by applying the conditional Expressions (5) and (13) to the Y direction as well.

In the above embodiment, the distortion correction unit 44 executes image transformation processing for wide angle distortion correction only when the selected photographing mode is portrait mode, or when a face is recognized in an image, but the present invention is not limited to this, and image transformation processing may be performed when another photographing mode (e.g. night view portrait mode) is selected.

In the above embodiment, functional blocks, such as the face detection unit 41 and the distortion correction unit 44, are disposed in FIG. 2 to simplify description, but according to the present embodiment, the CPU implements each function based on a predetermined control program.

The image transformation processing to transform an image captured by a normal projection system into an image in the above mentioned predetermined projection system is not limited to the processing by a digital camera 1 (distortion correction unit thereof), but an image photographed by a camera may be transformed by a computer (image processor) having a CPU, for example, and needless to say, similar effect can be implemented.

Now the image correction method according to an embodiment of the present invention will be described with reference to the flow chart in FIG. 8.

This method has an image acquisition step of acquiring an image formed by the photographing optical system and a distortion correction step of correcting distortion generated in the image based on a focal length of the photographing optical system and an incident angle θ of a ray from an object to the photographing optical system, and the distortion correction performed in this distortion correction step is executed by changing the amount of correction according to the focal length of the photographing optical system and the incident angle θ.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A camera, comprising:
a processing unit which, when distortion of an image of an object formed by a photographing optical system is corrected based on a focal length of the photographing optical system and an incident angle θ of a ray from the object to the photographing optical system, changes an amount of the correction of the distortion of the image of the object according to the incident angle θ,
wherein the processing unit executes the correction of the distortion of the image of the object according to a first projection system that satisfies the conditional expression:

$$f\cdot\theta<y<f\tan\theta$$

where y denotes an image height of the image of the object, and f denotes the focal length of the photographing optical system.

2. The camera according to claim 1, further comprising a face detection unit which detects a face in the object, wherein the processing unit changes the amount of the correction of the distortion of the image of the object when the face detection unit detects a face in the image of the object.

3. The camera according to claim 1, further comprising a face detection unit which detects a face in the object, wherein
the processing unit changes the amount of the correction of the distortion of the image of the object when the face detection unit detects a face at least in an edge portion of the image of the object.

4. The camera according to claim 1, further comprising a portrait mode in which the object is assumed to be an individual, wherein the processing unit changes the amount of the correction of the distortion of the image of the object when the portrait mode is applied.

5. The camera according to claim 1, further comprising a portrait mode in which the object is assumed to be an individual and a face detection unit which detects a face in the object, wherein
the processing unit changes the amount of the correction of the distortion of the image of the object when the portrait mode is applied, and the face detection unit detects a face at least in an edge portion of the image of the object.

6. The camera according to claim 1, wherein
the processing unit has first and second correction patterns, amounts of the correction of the distortion of the image of the object for the first and second correction patterns being different,
executes the correction of the distortion of the image of the object for the first correction pattern, according to a second projection system that satisfies the conditional expression:

$$y = f \tan \theta$$

and executes the correction of the distortion of the image of the object for the second correction pattern according to the first projection system that satisfies the conditional expression:

$$f\theta < y < f \tan \theta.$$

7. The camera according to claim 6, wherein
the correction of the distortion of the image of the object for the second correction pattern is further executed according to a third projection system that satisfies the conditional expressions:

$$x = f(u+1) \cdot \sin \theta / (u + \cos \theta)$$

$$0.3 < u < 0.7$$

where x denotes an image height from a center of the image of the object along at least one direction out of a long side direction and a short side direction of the image of the object which pass through the center of the image of the object and cross each other orthogonally, and u denotes a transformation coefficient of the third projection system.

8. The camera according to claim 7, wherein the one direction is the long side direction of the image of the object.

9. The camera according to claim 1, wherein
the processing unit executes distortion correction according to a third projection system that satisfies the conditional expressions:

$$x = f(u+1) \cdot \sin \theta / (u + \cos \theta)$$

$$0.3 < u < 0.7$$

where x denotes an image height from the center of the image of the object along at least one direction out of a long side direction and a short side direction of the image of the object, which pass through the center of the image of the object, and cross each other orthogonally, and u denotes a transformation coefficient of the third projection system.

10. The camera according to claim 9, wherein the one direction is a long side direction of the image of the object.

11. An apparatus comprising a processing unit which, when distortion of an image of an object is corrected based on a focal length of a photographing optical system and an incident angle θ of a ray from the object to the photographing optical system, changes an amount of the correction of the distortion of the image of the object according to the incident angle θ,
wherein the processing unit executes the correction of the distortion of the image of the object according to a projection system that satisfies the conditional expression:

$$f\theta < y < f \tan \theta$$

wherein y denotes an image height of the image of the object, and f denotes the focal length of the photographing optical system.

12. An image correction method comprising:
an image acquisition step of acquiring an image of an object formed by a photographing optical system;
a distortion correction step of correcting, by a processing unit, a distortion generated in the image of the object based on a focal length of the photographing optical system and an incident angle θ of a ray from the object to the photographing optical system, wherein
the distortion correction is executed by changing an amount of the correction of the distortion generated in the image of the object based on the focal length of the photographing optical system and the incident angle θ, and
the distortion correction is executed according to a first projection system that satisfies the conditional expression:

$$f\theta < y < f \tan \theta$$

where y denotes an image height of the image of the object, and f denotes a focal length of the photographing optical system.

13. The method according to claim 12, further comprising a face detection unit which detects a face in the object, wherein
the amount of the correction of the distortion generated in the image of the object is changed when the face detection unit detects a face in at least an edge portion of the image of the object.

14. The method according to claim 12, wherein
the distortion correction is executed according to a second projection system that satisfies the conditional expressions:

$$x = f(u+1) \cdot \sin \theta / (u + \cos \theta)$$

$$0.3 < u < 0.7$$

where x denotes an image height from a center of the image of the object along at least one direction out of a long side direction and a short side direction of the image of the object, which pass through the center of the image of the object and cross each other orthogonally, and u denotes a transformation coefficient of the second projection system.

15. A camera, comprising:
a processing unit which, when distortion of an image of an object formed by a photographing optical system is corrected based on a focal length of the photographing optical system and an incident angle θ of a ray from the object to the photographing optical system, changes an amount of the correction of the distortion of the image of the object according to the incident angle θ,
wherein the processing unit executes the correction of the distortion of the image of the object according to a projection system that satisfies the conditional expressions:

$$x = f(u+1) \cdot \sin \theta / (u + \cos \theta)$$

$$0.3 < u < 0.7$$

where x denotes an image height from a center of the image of the object along at least one direction out of a long side direction and a short side direction of the image of the object, which pass through the center of the image of the object and cross each other orthogonally, and u denotes a transformation coefficient of the projection system.

* * * * *